Figure 1:
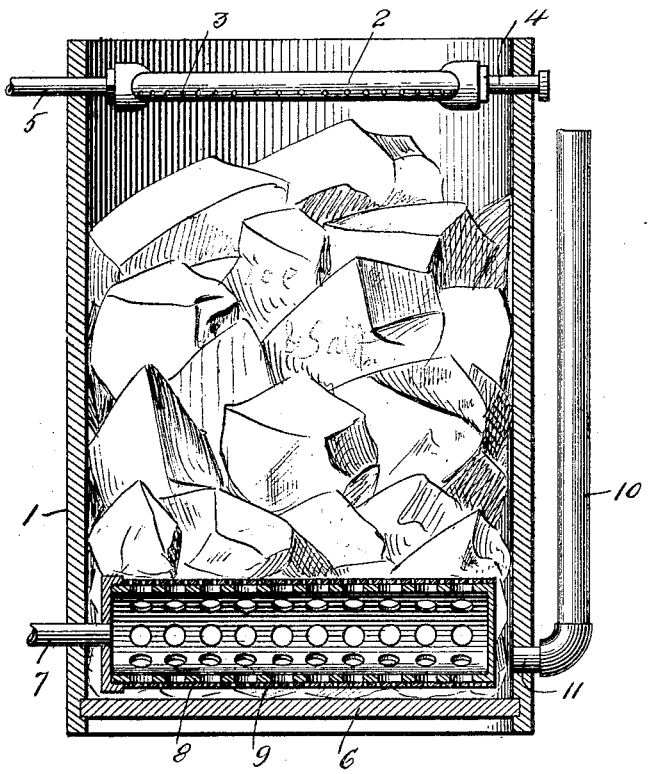

No. 897,284. PATENTED SEPT. 1, 1908.
H. J. GERNER.
APPARATUS FOR MAKING BRINE.
APPLICATION FILED JUNE 12, 1907.

WITNESSES:
Samuel Payne
H. H. Butler

INVENTOR
Henry J. Gerner.
BY H. C. Everett & Co.
Attorneys

UNITED STATES PATENT OFFICE.

HENRY J. GERNER, OF CANTON, OHIO, ASSIGNOR TO MARY GERNER, OF CANTON, OHIO.

APPARATUS FOR MAKING BRINE.

No. 897,284.  Specification of Letters Patent.  Patented Sept. 1, 1908.

Application filed June 12, 1907. Serial No. 378,508.

*To all whom it may concern:*

Be it known that I, HENRY J. GERNER, citizen of the United States of America, residing at Canton, in the county of Stark and State of Ohio, have invented certain new and useful Improvements in Apparatus for Making Brine, of which the following is a specification, reference being had therein to the accompanying drawing.

This invention relates to an apparatus for making brine, and the invention has for its object to provide a suitable receptacle with positive and reliable means for insuring a perfect distribution of water over ice and salt placed in said receptacle, thereby obtaining a brine of an algid degree of temperature, with a minimum expenditure of ice and salt.

My invention aims to provide an apparatus particularly designed for producing brine used in the manufacture of ice cream, particularly ice cream machines of the continuous type, where it is essential to freely and incessantly circulate brine to congeal the cream passing through the ice cream machine or can. To this end, I employ an ordinary tub or receptacle and locate in the bottom of the tub a perforated drum through which brine is withdrawn from the tub. The tub is adapted to retain the ice and salt from which the brine is made, and in the top of the tub, I arrange a sprinkler head for equally spraying water or previously prepared brine over the ice and salt. When brine is circulated through the tub, as would occur in a continuous ice cream making machine, the liquefaction of the ice within the tub is reduced to a minimum, while a maximum or hyperboreal degree of temperature is obtained.

My improved brine apparatus, while particularly designed for ice cream making machines, is also applicable to breweries, ice making machines, refrigeratory plants, and cold-storage installations.

The preferred embodiments of my invention will be hereinafter more fully described and then specifically pointed out in the appended claims.

Figure 2:
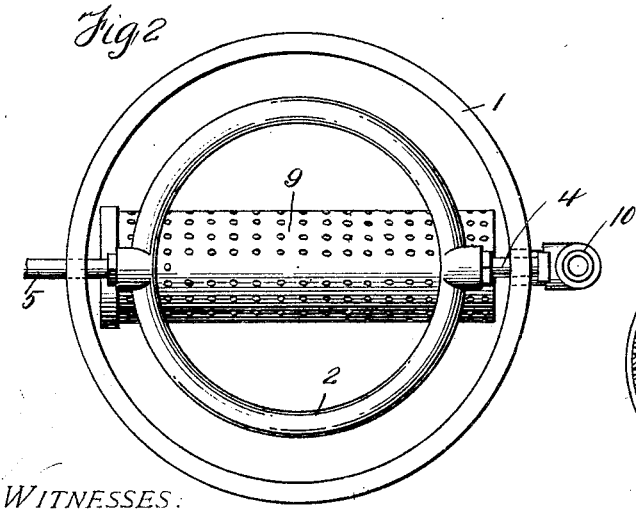
Figure 3:
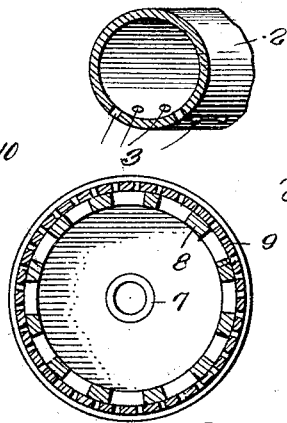
Figure 4:

Referring to the drawing forming part of this specification, like numerals of reference designate corresponding parts throughout the several views, in which:

Figure 1 is a vertical sectional view of an apparatus for making brine, Fig. 2 is a plan of the same, Fig. 3 is a detail sectional view of a sprinkler used in connection with the apparatus, and Fig. 4 is a cross sectional view of a perforated drum.

To put my invention into practice, I use a conventional form of tub or receptacle 1 for containing ice and salt, employed in connection with water for producing a brine solution. Contiguous to the top of the tub or receptacle I arrange a horizontally disposed circular sprinkler head 2, preferably made of tubing provided with openings 3 upon its under side disposed radially with respect to the circumferential axis of the circular sprinkler head. One side of the head is trunnioned in the tub by a tubular closed stem or trunnion 4, while the opposite side of the head is trunnioned or held in engagement with the tub or receptacle 1 by an inlet pipe 5, which in practice connects with a suitable pump (not shown) by virtue of which a circulating brine system is established in connection with continuous ice cream freezers, or a refrigeratory installation.

Adjacent to the base or bottom 6 of the tub or receptacle 1, I arrange an outlet pipe 7 adapted to convey brine to the machine or installation, where it is employed for congealing liquid. The inner end of the pipe 7 connects with a perforated drum or cylinder 8 having a perforated covering or screen 9, the openings of which are of a less diameter than the openings of the drum 8, the cover or screen 9 serving functionally to prevent the ingress of solid salt and ice entering the drum 8 and eventually the pipe 7. The lower end of the tub or receptacle 1 is also provided with an overflow pipe 10 that can be swung upon the connection 11 to establish an overflow at any desired elevation with relation to the tub or receptacle 1.

It will be apparent from the illustration of my invention that the ice and salt placed in the tub or receptacle 1 will be subjected to the action of water sprayed upon the same by the sprinkler head 2, consequently more beneficial results are obtained than if the water was allowed to flow into the tub or receptacle 1 at one place.

I have found by actual use of my apparatus, that I am able to produce a brine having a temperature below zero, and since the solidity or congelation of the material in a machine or refrigeratory installation entirely depends upon the infrigidation of the brine it will be apparent that a liquid or material can be frozen with considerable rapidity.

The sprinkler head is trunnioned in the tub or receptacle 1 whereby it can be easily removed or inverted to cleanse the openings 3 of the head, should the same become closed by the freezing or coagulation of the brine.

What I claim and desire to secure by Letters Patent, is:—

1. In a brine apparatus, the combination of a tub for holding ice and salt, a circular sprinkler head trunnioned in the upper end of said tub and having an inlet pipe serving functionally as a trunnion, said head having openings formed in its lower side disposed radially with relation to the circumferential axis of said head, an outlet pipe located adjacent to the bottom of said tub, a perforated drum connected to said pipe, a screen inclosing said drum, and an overflow pipe movably mounted at the side of said tub and entering the same adjacent to the bottom thereof.

2. A brine apparatus consisting of a receptacle for containing ice and salt, a circular sprinkler head trunnioned in the upper end of said receptacle and having openings formed therein, an inlet pipe connecting with said head and serving functionally as a trunnion, an outlet pipe arranged in said receptacle, a perforated drum connected to said pipe within said receptacle, a screen surrounding said drum, and an overflow pipe arranged at the side of said receptacle.

3. A brine apparatus consisting of a receptacle, a circular sprinkler head trunnioned in the upper end of said receptacle, an inlet pipe connecting with said head and constituting one of the trunnions therefor, an outlet pipe arranged at the lower end of said receptacle, a perforated drum connecting with said pipe within said receptacle, and a screen covering the perforations of said drum.

4. In a brine apparatus, a receptacle, a sprinkler-head trunnioned in the walls of said receptacle near the upper end thereof, an inlet pipe connecting with said head and constituting one of the trunnions therefor, and an outlet pipe connected to said receptacle near the lower end thereof.

5. In a brine apparatus, a receptacle, a sprinkler-head trunnioned in the walls of said receptacle near the upper end thereof, an inlet pipe connecting with said head and constituting one of the trunnions therefor, a perforated drum located in the bottom of the receptacle, and an outlet pipe communicating with said drum.

In testimony whereof I affix my signature in the presence of two witnesses.

HENRY J. GERNER.

Witnesses:
J. P. FAWCETT,
ANNA M. CONRAD.